(12) United States Patent
Kwon et al.

(10) Patent No.: US 12,300,440 B2
(45) Date of Patent: May 13, 2025

(54) MULTI-LAYER CERAMIC ELECTRONIC COMPONENT AND BOARD FOR MOUNTING THE SAME

(71) Applicant: Samsung Electro-Mechanics Co., Ltd., Suwon-si (KR)

(72) Inventors: Byeong Chan Kwon, Suwon-si (KR); Ji Hun Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 575 days.

(21) Appl. No.: 17/384,019

(22) Filed: Jul. 23, 2021

(65) Prior Publication Data

US 2022/0199330 A1 Jun. 23, 2022

(30) Foreign Application Priority Data

Dec. 23, 2020 (KR) .......................... 10-2020-0182056

(51) Int. Cl.
*H01G 4/30* (2006.01)
*H01G 2/06* (2006.01)
(Continued)

(52) U.S. Cl.
CPC .............. *H01G 4/30* (2013.01); *H01G 2/065* (2013.01); *H01G 4/012* (2013.01); *H01G 4/224* (2013.01)

(58) Field of Classification Search
None
See application file for complete search history.

(56) References Cited

U.S. PATENT DOCUMENTS 8,867,190 B2 10/2014 Kim et al.
9,281,124 B2 3/2016 Lee et al.
(Continued)

FOREIGN PATENT DOCUMENTS

JP 05074644 A * 3/1993 ............... H01G 4/30
JP 2013-058718 A 3/2013
(Continued)

OTHER PUBLICATIONS

Office Action dated Feb. 12, 2025 issued in with corresponding to Japanese Patent Application No. 2021-129352, with English translation.

*Primary Examiner* — Eric W Thomas
(74) *Attorney, Agent, or Firm* — Morgan, Lewis & Bockius LLP

(57) ABSTRACT

A multilayer ceramic electronic component includes: a ceramic body including a dielectric layer and a first internal electrode and a second internal electrode a first external electrode and a second external electrode, wherein the ceramic body includes a capacitance formation portion including a first internal electrode and a second internal electrode stacked in a second direction to form capacitance, a first margin portion, a second margin portion, a first cover portion and a second cover portion, wherein an average length of the ceramic body in a first direction satisfies a range of exceeding 1 time and/or less than 3 times an average width (a) of the ceramic body in the second direction, wherein the average width (a) of the ceramic body in the second direction and an average height (b) of the ceramic body in a third direction satisfies a relationship of b>a.

35 Claims, 8 Drawing Sheets

(51) Int. Cl.
*H01G 4/012* (2006.01)
*H01G 4/224* (2006.01)

(56) References Cited

U.S. PATENT DOCUMENTS

| | | | |
|---|---|---|---|
| 9,330,844 B2 | 5/2016 | Ahn et al. | |
| 10,468,191 B2 | 11/2019 | Yamada et al. | |
| 2012/0152604 A1* | 6/2012 | Ahn | H01G 4/30 29/829 |
| 2013/0063862 A1* | 3/2013 | Kim | H01G 4/30 156/182 |
| 2014/0168849 A1* | 6/2014 | Lee | H01G 4/12 361/301.4 |
| 2014/0182910 A1* | 7/2014 | Ahn | H01G 2/06 361/321.2 |
| 2014/0307362 A1 | 10/2014 | Kim et al. | |
| 2015/0200054 A1* | 7/2015 | Lee | H01G 4/12 29/25.42 |
| 2016/0099108 A1* | 4/2016 | Koide | H01G 4/224 361/301.4 |
| 2016/0126012 A1 | 5/2016 | Kim et al. | |
| 2017/0062133 A1 | 3/2017 | Lee et al. | |
| 2018/0197682 A1* | 7/2018 | Yamada | H01G 4/005 |
| 2020/0176189 A1* | 6/2020 | Koo | H01G 4/2325 |
| 2020/0294720 A1 | 9/2020 | Kowase | |
| 2020/0357574 A1 | 11/2020 | Tanaka et al. | |

FOREIGN PATENT DOCUMENTS

| | | |
|---|---|---|
| JP | 2014-132631 A | 7/2014 |
| JP | 2014-212295 A | 11/2014 |
| JP | 2015-133470 A | 7/2015 |
| JP | 2018-113367 A | 7/2018 |
| JP | 2020-149996 A | 9/2020 |
| JP | 2020-184593 A | 11/2020 |
| KR | 10-2016-0053682 A | 5/2016 |
| KR | 10-2017-0024749 A | 3/2017 |

* cited by examiner

MULTI-LAYER CERAMIC ELECTRONIC COMPONENT AND BOARD FOR MOUNTING THE SAME

CROSS-REFERENCE TO RELATED APPLICATION

This application claims the benefit of priority to Korean Patent Application No. 10-2020-0182056 filed on Dec. 23, 2020 in the Korean Intellectual Property Office, the disclosure of which is incorporated herein by reference in its entirety.

TECHNICAL FIELD

The present disclosure relates to a multilayer ceramic electronic component and a board for mounting the same.

BACKGROUND

In general, electronic components using ceramic materials such as capacitors, inductors, piezoelectric elements, varistors, thermistors, or the like, may include a ceramic body made of a ceramic material, internal electrodes formed inside the body, and external electrodes installed on a surface of the ceramic body to be connected to the internal electrodes.

In recent years, as electronic products have been miniaturized and multifunctionalized, chip components have also been miniaturized and made highly functional. Therefore, multilayer ceramic electronic components are also required for high-capacity products with small sizes and high capacitance.

Conventionally, an area of the dielectric layer was formed to be larger than an area of the internal electrode, so that a margin region was formed in a remaining circumferential portion of the internal electrodes excluding the portion connected to the external electrode. However, in this case, when tens to hundreds of dielectric layers are stacked, the dielectric layer is stretched to fill a step, and internal electrodes are also bent. When the internal electrode is bent, a problem in which breakdown voltage (BDV) decreases in the corresponding part may occur.

In solve this problem, a method of separately preparing and attaching a sheet-shaped margin portion has recently been used. However, when a separately manufactured sheet is attached to form a margin portion, there is a problem that delamination may occur between the margin portion and the ceramic body.

In particular, in order to realize high capacitance, it is necessary to increase an area of overlap of internal electrodes or increase the number of stacked internal electrodes. However, when the area of overlap of the internal electrodes is increased, an area occupied by the electronic component on the substrate increases, such that there may be a problem in which a degree of space utilization and a degree of freedom in mounting are reduced. In addition, if the number of stacked internal electrodes is increased, the area to which the sheet-shaped margin portion should be attached becomes wider, which increases a bonding surface where delamination may occur, and lifting or flaring of the margin portion may occur, such that there may be a problem in which reliability may decrease or short-circuit defects may occur.

SUMMARY

An aspect of the present disclosure is to provide a multilayer ceramic electronic component and a mounting board thereof capable of reducing an amount of short circuits.

An aspect of the present disclosure is to provide a multilayer ceramic electronic component and a mounting board thereof for improving moisture resistance reliability and a mounting board thereof.

An aspect of the present disclosure is to provide a multilayer ceramic electronic component and a mounting board thereof for increasing mounting density of a board of the multilayer ceramic electronic component and a mounting board thereof.

An aspect of the present disclosure is to provide a multilayer ceramic electronic component and a mounting board thereof capable of increasing a degree of freedom in mounting.

According to an embodiment of the present disclosure, a multilayer ceramic electronic component includes: a ceramic body including a dielectric layer, and first and second internal electrodes disposed to oppose each other with the dielectric layer interposed between the first and second internal electrodes; a first external electrode connected to the first internal electrode; and a second external electrode connected to the second internal electrode, wherein the ceramic body includes: a capacitance formation portion including first and second surfaces opposing each other in a first direction, third and fourth surfaces opposing each other in a second direction, and fifth and sixth surfaces opposing each other in a third direction, and including the first internal electrode and the second internal electrode stacked in the second direction to form capacitance, a first margin portion disposed on the third surface of the capacitance formation portion, a second margin portion disposed on the fourth surface of the capacitance formation portion, and a first cover portion and a second cover portion respectively disposed on both surfaces of the capacitance formation portion in the third direction, the first margin portion, and the second margin portion in the third direction, wherein an average length of the ceramic body in the first direction is in a range from 1 to 3 times an average width (a) of the ceramic body in the second direction, and the average width (a) of the ceramic body in the second direction and an average height (b) of the ceramic body in the third direction satisfies b>a.

According to another embodiment of the present disclosure, a mounting board for mounting a multilayer ceramic electronic component includes: a ceramic body including a dielectric layer, and first and second internal electrodes disposed to oppose each other with the dielectric layer between the first and second internal electrodes; a first external electrode connected to the first internal electrode; and a second external electrode connected to the second internal electrode, wherein the ceramic body includes: a capacitance formation portion including first and second surfaces opposing each other in a first direction, third and fourth surfaces opposing each other in a second direction, and fifth and sixth surfaces opposing each other in a third direction, and including the first internal electrode and the second internal electrode stacked in the second direction, a first margin portion disposed on the third surface of the capacitance formation portion, a second margin portion disposed on the fourth surface of the capacitance formation portion, and first and second cover portions respectively disposed on both surfaces of the capacitance formation portion in the third direction, and the first and second margin portions in the third direction, aboard on which a first electrode pad and a second electrode pad are disposed on one surface in the third direction, and a solder, wherein an average length of the ceramic body in the first direction is in a range from 1 to 3 times an average width (a) of the ceramic body in the second direction, and the average width (a) of the ceramic body in the second direction and an average height (b) of the ceramic body in the third direction may satisfy b>a.

According to another embodiment of the present disclosure, a multilayer ceramic electronic component includes: a ceramic body including a dielectric layer, and a first internal electrode and a second internal electrode disposed to oppose each other with the dielectric layer interposed between the first and second internal electrodes. The ceramic body comprises a capacitance formation portion including a first surface and a second surface opposing each other in a first direction, a third surface and a fourth surface opposing in a second direction, and a fifth surface and a sixth surface opposing in a third direction, and including the first internal electrode and the second internal electrode stacked in the second direction to form capacitance. A length of the ceramic body in the first direction is in a range from 1 to 3 times a width of the ceramic body in the second direction, and a height of the ceramic body in the third direction is greater than the width of the ceramic body in the second direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
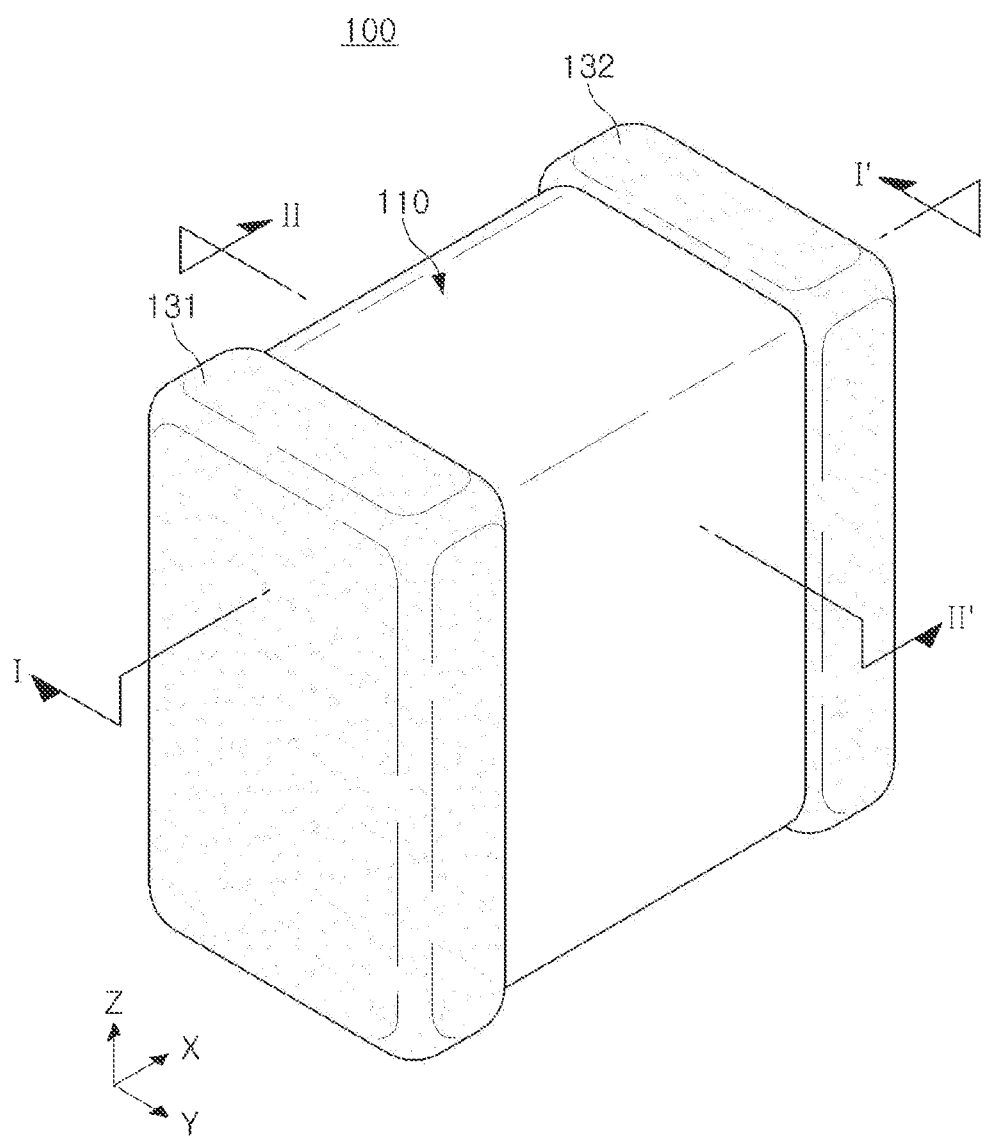
FIG. 1 is a schematic perspective view of a multilayer ceramic electronic component according to an embodiment of the present disclosure.

Hereinafter, embodiments of the present disclosure will be described in detail with reference to the accompanying drawings. The present disclosure may, however, be exemplified in many different forms and should not be construed as being limited to the specific embodiments set forth herein, but should be understood to include various modifications, equivalents, and/or alternatives to the embodiments of the present disclosure. In relation to the description of the drawings, similar reference numerals may be used for similar components.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the present specification, expressions such as "having", "may have", "comprises", or "may contain" may include a presence of a corresponding feature (e.g., components such as numerical, functions, operations, components, or the like), and a presence of additional feature does not be excluded.

In this specification, that a member is disposed "on" a certain component includes not only the case where the member is disposed in direct contact with the component, but also the case where another component is disposed between the component and the member.

In the present specification, expressions such as "A or B", "at least one of A or/and B", "one or more of A or/and B", or the like may include all possible combinations items listed together. For example, "A or B", "at least one of A and B", or "at least one of A or B" may refer to include cases of (1) at least one A, (2) at least one B, or (3) both including at least one A and at least one B.

In the drawing, an X direction may be defined as a first direction, and an L direction or a length direction, a Y direction may be defined as a second direction, and a W direction or a width direction, and a Z direction may be defined as a third direction, and a T direction or a thickness direction.

The present disclosure relates to a multilayer ceramic electronic component. FIGS. 1 to 6 are diagrams schematically illustrating a multilayer ceramic electronic component according to an embodiment of the present disclosure. Referring to FIGS. 1 to 6, a multilayer ceramic electronic component 100 according to an embodiment of the present disclosure: includes a ceramic body 110 including a dielectric layer 111, and a first internal electrode 121 and a second internal electrode 122 disposed to oppose each other with the dielectric layer 111 interposed therebetween; a first external electrode 131 connected to the first internal electrode 121; and a second external electrode 132 connected to the second internal electrode 122, wherein the ceramic body 110 may include a capacitance formation portion 130 including a first surface S1 and a second surface S2 opposing each other in a first direction (X direction), a third surface S3 and a fourth surface S4 opposing each other in a second direction (Y direction), and a fifth surface S5 and a sixth surface S6 opposing each other in a third direction (Z direction), and a first internal electrode 121 and a second internal electrode 122 stacked in the second direction (Y direction), a first margin portion 112 disposed on the third surface S3 of the capacitance formation portion 130, a second margin portion 113 disposed on the fourth surface S4 of the capacitance formation portion 130, and a first cover portion 141 and a second cover portion 142 respectively disposed on both surfaces of the capacitance formation portion 130, the first margin portion 112, and the second margin portion 113 in the third direction (Z direction).

In this case, an average width (a) of the ceramic body 110 in the second direction (Y direction) and an average height (b) of the ceramic body 110 in the third direction (Z direction) may satisfy b>a, and an average length of the ceramic body 110 in the first direction (X direction) may satisfy a range of exceeding 1 time and/or less than 3 times of the average width (a) of the ceramic body 110 in the second direction (Y direction). Conventionally, in order to increase the capacitance of the multilayer ceramic electronic component, the number of stacked internal electrodes is often increased. In this case, if the dielectric layer is formed to be wider than the internal electrode to form a margin portion, there is a problem that as the number of stacked dielectric layers increases, a defect due to a step difference of the internal electrode increases may occur.

On the other hand, when the capacitance formation portion is formed so that the internal electrode is exposed to a side surface and a ceramic sheet is attached on a surface where the internal electrode is exposed to form a margin portion, a ratio of an area in which the ceramic sheet forming the margin portion is in contact with the internal electrode, compared to the area in contact with the ceramic, and accordingly, when ceramic and metals are sintered, the possibility of defects due to a difference in shrinkage behaviors increases. The multilayer ceramic electronic component 100 according to the present disclosure has a structure in which a height (b) of the ceramic body 110 in the third direction (Z direction) is greater than a width (a) of the ceramic body 110 in the second direction (Y direction), and the first internal electrode 121 and the second internal electrode 122 are stacked in a second direction (Y direction) simultaneously, so that an area of overlap of the first internal electrode 121 and the second internal electrode 122 may be increased to increase capacitance. In addition, at the same time, delamination of the margin portion can be effectively suppressed by reducing a ratio of an area in which the ceramic sheet attached to an exterior surface to form the margin portion is in contact with a metal electrode.

Like the average width (a) of the ceramic body 110 in the second direction (Y direction) in the present specification, a "width" of any member may be a value with respect to the member measured in the second direction (Y direction), and may mean the shortest vertical distance from one surface in the second direction (Y direction) to the other surface in the second direction (Y direction). In addition, an "average width" of any member may mean an arithmetic average of widths of the member measured at 10 locations. Specifically, the average width may be perpendicular to the X axis, and may be an arithmetic average of values with respect to a cutting surface passing through a center of the member, measured at 10 equally spaced locations in the Z axis direction. More specifically, in order to reduce errors, 10 locations, excluding regions corresponding to both surfaces in the third direction, can be measured and an average thereof may be obtained, and in this case, the cutting surface may be divided into 12 in the Z-axis direction, and then an average of a measurement value of the 10 locations there inside may be obtained, and an average width thereof may be obtained. In addition, like an average height (b) of the ceramic body 110 in the third direction (Z direction) in this specification, a "height" of any member may be a value with respect to the member measured in the third direction (Z direction), and may mean the shortest vertical distance from one surface in the third direction (Z direction) to the other surface in the third direction (Z direction). In addition, the "average height" of any member may mean an arithmetic average of the heights measured at 10 locations of the member. Specifically, the average height may be perpendicular to an X axis, and may be an arithmetic average of values measured at 10 equally spaced locations in the Z axis direction with respect to a cutting surface passing through a center of the member. More specifically, in order to reduce errors, 10 locations, excluding regions corresponding to both surfaces in the third direction, can be measured and an average thereof may be obtained. In this case, after dividing the cutting surface into 12 in the Z-axis direction, an average height can be obtained by obtaining a measurement value of the 10 locations there inside. Like the average length of the ceramic body 110 in the first direction (X direction) in this specification, the "length" of any member may be a value with respect to the member measured in the first direction (X direction), and may mean the shortest vertical distance from one surface in the direction (X direction) to the other surface in the first direction (X direction). In addition, the "average length" of any member may mean an arithmetic average of lengths measured at 10 locations of the member. Specifically, the average length may be perpendicular to a Y axis, and may be an arithmetic average of values with respect to a cutting surface passing through a center of the member measured at 10 equally spaced locations in the X axis direction. More specifically, to reduce errors, 10 locations, excluding regions corresponding to both surfaces in the first direction, may be measured and an average thereof may be obtained, and in this case, after dividing the cutting surface into 12 in the X-axis direction, an average length thereof may be obtained by obtaining an average of measurement values of the 10 locations there inside.

When the average length of the ceramic body 110 in the first direction (X direction) satisfies a range of exceeding 1 time and/or less than 3 times the average width (a) of the ceramic body 110 in the second direction (Y direction), an area of overlap of internal electrodes opposing each other in the second direction (Y direction) may be increased to secure sufficient capacitance. In addition, when the average width (a) of the ceramic body 110 in the second direction (Y direction) and the average height (b) of the ceramic body 110 in the third direction (Z direction) satisfy b>a, a dimension thereof in the third direction (Z direction) may have a structure larger than the dimension in the second direction (Y direction), for example, may have a structure in which the thickness is greater than the width.

In one example of the present disclosure, an average length of the ceramic body 110 of the multilayer ceramic electronic component in the first direction (X direction) may be exceeding 1.0 time, 1.2 times or more, 1.4 times or more, 1.6 times or more, or 1.8 times or more the average width (a) of the ceramic body 110 in the second direction (Y direction), and may be less than 3.0 times, 2.6 times or less, 2.4 times or less, or 2.2 times or less, but is not limited thereto.

In one example, the average width (a) of the ceramic body 110 of the multilayer ceramic electronic component 100 of the present disclosure in the second direction (Y direction) and the average height (b) of the ceramic body 110 in the third direction (Z direction) may satisfy b≥1.2×a. That is, b may be 1.2 times or more of a. The b may be 1.20 times or more, 1.21 times or more, 1.22 times or more, 1.23 times or more, 1.24 times or more, or 1.25 times or more of a, and an upper limit thereof may not be particularly limited, but may be, for example, 10 times or less. The conventional multilayer ceramic electronic components generally had a structure having the same width and height of a ceramic body. On the other hand, when the average width (a) of the ceramic body 110 in the second direction (Y direction) and the average height (b) of the ceramic body 110 in the third direction (Z direction) satisfy the range of this example, moisture resistance reliability may be improved while increasing the capacitance of the multilayer ceramic electronic component 100.

In an embodiment of the present disclosure, any one surface of both surfaces of the ceramic body of the present disclosure in the third direction may be amounting surface for an external board. When the multilayer ceramic electronic component according to the present disclosure is mounted on an external substrate, the mounting surface may mean one surface of the ceramic body located closest to the external substrate.

The ceramic body 110 of the multilayer ceramic electronic component 100 according to the present disclosure may include a capacitance formation portion 130.

There is no particular limitation on the specific shape of the capacitance formation portion 130, but as shown, the capacitance formation portion 130 may have a hexahedral shape or a similar shape. Due to shrinkage of the ceramic powder included in the capacitance formation portion 130 during a sintering process, the capacitor 130 may have a substantially hexahedral shape although not a hexahedral shape having a complete straight line. If necessary, the capacitance formation portion 130 may be rounding processed so that corners are not angled. The rounding process may use, for example, barrel polishing, but is not limited thereto.

In the capacitance formation portion 130 of the multilayer ceramic electronic component according to the present disclosure, a dielectric layer 111, a first internal electrode 121, and a second internal electrode 122 may be alternately stacked. The dielectric layer 111, the first internal electrode 121, and the second internal electrode 122 may be stacked in a second direction (Y direction). The fact that the first internal electrode 121 and the second internal electrode 122 of the multilayer ceramic electronic component 100 according to the present disclosure are stacked in the second direction (Y direction), which may mean that the first internal electrode 121 and the second internal electrodes 122 are stacked in a width direction, and the first internal electrode 121 and the second internal electrode 122 are formed all exposed to both surfaces of the capacitance formation portion 130 in the third direction (Z direction). In the above structure, one surface of the capacitance formation portion 130 in the third direction (Z direction) may be a mounting surface on the external board, and in this case, the first internal electrode 121 and the second internal electrode 122 may be disposed in a form, perpendicular to the mounting surface. The plurality of dielectric layers 111 forming the capacitance formation portion 130 are in a sintered state, and a boundary between the adjacent dielectric layers 111 may be integrated to such an extent that it is difficult to determine without using a scanning electron microscope (SEM).

According to an embodiment of the present disclosure, a raw material for forming the dielectric layer 111 is not particularly limited as long as sufficient electrostatic capacitance can be obtained. For example, a barium titanate-based material, a lead composite perovskite-based material, a strontium titanate-based material, or the like may be used, or a component represent by $(Ba_{1-x}Ca_x)(Ti_{1-y}(Zr, Sn, Hf)_y)O_3$ (where, $0 \leq x \leq 1$, $0 \leq y \leq 0.5$) can be used. In addition, as a material for forming the dielectric layer 111, various ceramic additives, organic solvents, plasticizers, binders, dispersants, or the like may be added to powder such as barium titanate ($BaTiO_3$) according to the object of the present disclosure.

The dielectric layer 111 may be formed by adding an additive to a slurry containing the above-described material as necessary, and applying and drying the same on a carrier film to prepare a plurality of ceramic sheets. The ceramic sheet may be formed by manufacturing the slurry in a sheet shape having a thickness of several µms by a doctor blade method, but is not limited thereto.

In one example, an average thickness of the dielectric layer 111 may be 0.4 µm or less. The average thickness of the dielectric layer 111 may be an average of values measured in five different locations of the fired dielectric layer 111. A lower limit of the average thickness of the dielectric layer 111 is not particularly limited, but may be, for example, 0.01 µm or more.

The first and second internal electrodes 121 and 122 may be stacked so that each end surface is exposed to both end portions of the capacitance formation portion 130 opposing each other. Specifically, the first and second internal electrodes 121 and 122 may be exposed to both surfaces of the capacitance formation portion 130 in the first direction (X direction), respectively, and the first internal electrode 121 may be exposed to the first surface S1 of the capacitance formation portion 130, and the second internal electrode 122 may be exposed to the second surface S2.

A material for forming the first and second internal electrodes 121 and 122 is not particularly limited, and for example, may be formed using a conductive paste including one or more of silver (Ag), palladium (Pd), gold (Au), platinum (Pt), nickel (Ni), Copper (Cu), tin (Sn), tungsten (W), titanium (Ti), and alloys thereof.

The capacitance formation portion 130 may be formed by alternately stacking a ceramic green sheet on which a first internal electrode 121 is printed and a ceramic green sheet on which a second internal electrode 122 is printed on the dielectric layer 111 in a third direction (Z direction). A printing method of the first and second internal electrodes 121 and 122 may be a screen-printing method or a gravure printing method, but is not limited thereto.

An average thickness of the first and second internal electrodes 121 and 122 may be 0.4 µm or less. The average thickness of the internal electrodes may be an average of values measured at five different locations of the fired internal electrodes. A lower limit of the average thickness of the first and second internal electrodes is not particularly limited, but may be, for example, 0.01 µm or more.

The ceramic body 110 of the multilayer ceramic electronic component 100 according to the present disclosure may include a first margin portion 112 and a second margin portion 113 respectively disposed on both surfaces of the capacitor 130 in the second direction (Y direction). The first margin portion 112 may be disposed on a third surface S3 of the capacitance formation portion 130, and may be disposed to cover at least a portion of the third surface S3 of the capacitance formation portion 130. The second margin portion 113 may be disposed on a fourth surface S4 of the capacitance formation portion 130, and may be disposed to cover at least a portion of the fourth surface S4 of the capacitance formation portion 130. In the present specification, any member is disposed to cover the capacitance formation portion 130, which may mean that the member is disposed so that a portion of the member covering the capacitive portion 130 is not exposed externally. The first margin portion 112 and the second margin portion 113 may be disposed on both surfaces of the capacitance formation portion 130 in the second direction (Y direction), and may be disposed on both surfaces of the first internal electrode 121 and the second internal electrode 122 in a stacking direction (Y direction). That is, a surface of the first margin portion 112 and the second margin portion 113, in contact with the capacitive portion 130 may be disposed to be in parallel with the first internal electrode 121 and the second internal electrode 122.

For example, a deviation (|xy|/x) of an average height (x) of the first margin portion 112 and the second margin portion 113 in the third direction (Z direction) included in the ceramic body 110 of the multilayer ceramic electronic component 100 of the present disclosure and an average height (y) of the capacitance formation portion 130 in the third direction (Z direction) may be 5% or less. A deviation (|x−y|/y) of an average height (x) of the first margin portion 112 and the second margin portion 113 included in the ceramic body 110 in the third direction (Z direction) and an average height (y) of the capacitance formation portion 130 of the ceramic body 110 in the third direction (Z direction) may be 5% or less, 4% or less, or 3% or less, and a lower limit is not particularly limited, for example, may be 0% or more. When the deviation (|xy|/y) is 0%, it may mean that the average height of the first margin portion 112 and the second margin portion 113 is the same as the average height of the capacitance formation portion 130, and may mean that the first margin portion 112 and the second margin portion 113 are disposed to cover all of the capacitance formation portion 130 in the third direction (Z direction). The average height of the first margin portion 112 and the second margin portion 113 being the same as the average height of the capacitance formation portion 130 may mean not only the exact same, but also has the concept of a range including errors, for example, it may mean that the deviation is within 0.5%.

In one example, the first internal electrode 121 and/or the second internal electrode 122 of the multilayer ceramic electronic component 100 according to the present disclosure may be exposed to the capacitance formation portion 130 in the second direction (Y direction). The first internal electrode 121 and/or the second internal electrode 122 are exposed to the capacitance formation portion 130 in the second direction (Y direction), which may mean that the first internal electrode 121 and/or the second internal electrode 122 are disposed on an outermost region of the capacitance formation portion 130 in which the dielectric layer 111, and the first and second internal electrodes 121 and 122 are stacked in the second direction (Y direction). In this case, the first margin portion 112 and/or the second margin portion 113, described above, may be disposed in direct contact with the first internal electrode 121 and/or the second internal electrode 122. As in this example, even if the first internal electrode 121 and/or the second internal electrode 122 is disposed to be exposed to the capacitance formation portion 130 in the second direction (Y direction), the first and second internal electrodes 121 and 122 may not be exposed externally of the ceramic body 110 by the first and second margin portions. Therefore, the dielectric layer 111 may not be disposed on both surfaces of the first internal electrode 121 and/or the second internal electrode 122 in the stacking direction, and the inner electrode is exposed to an outermost region of the capacitance formation portion 130, such that an effective capacitance can be maximized.

According to an embodiment of the present disclosure, the ceramic body 110 of the multilayer ceramic electronic component according to the present disclosure may include a capacitance formation portion 130, and a first cover portion 141 and a second cover portion 142 respectively disposed on both surfaces of the capacitance formation portion 130 in the third direction (Z direction). In the capacitance formation portion 130 of the multilayer ceramic electronic component 100 according to the present disclosure, the first internal electrode 121 and the second internal electrode 122 may be stacked in the second direction (Y direction) with the dielectric layer 111 interposed therebetween.

The first internal electrode 121 may be drawn out to the first surface S1, the fifth surface S5, and the sixth surface S6 of the capacitance formation portion 130. The first internal electrode 121, drawn out to the first surface S1 of the capacitance formation portion 130 may be connected to a first external electrode 131 to be described later, and the first internal electrode 121 may not be drawn out to the second surface S2 of the capacitance formation portion 130. In addition, the second internal electrode 122 may be drawn out to the second surface S2, the fifth surface S5, and the sixth surface S6 of the capacitance formation portion 130. The second internal electrode 122, drawn out to the second surface S2 of the capacitance formation portion 130 may be connected to a second external electrode 132 to be described later, and the first internal electrode 121 may not be drawn out to the first surface S1 of the capacitance formation portion 130.

Figure 2:
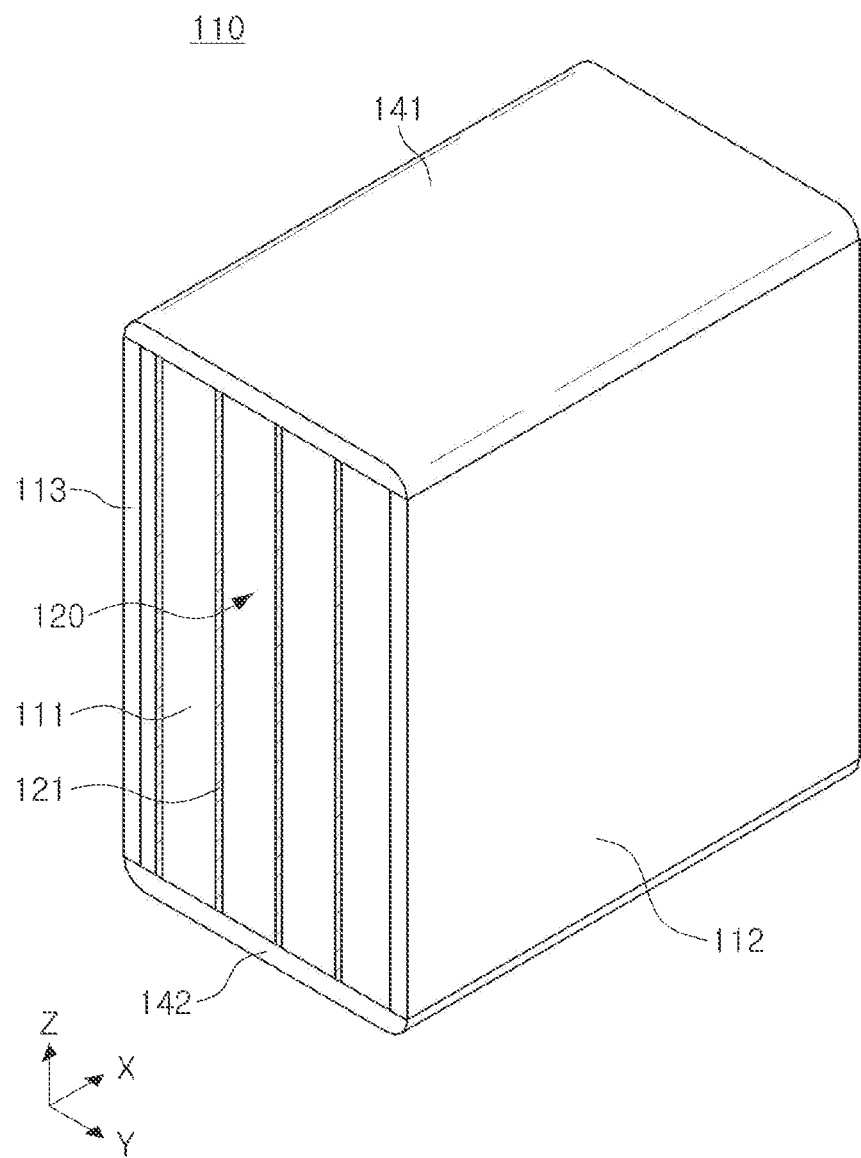
FIG. 2 is a perspective view schematically illustrating the ceramic body of FIG. 1.
Figure 3:
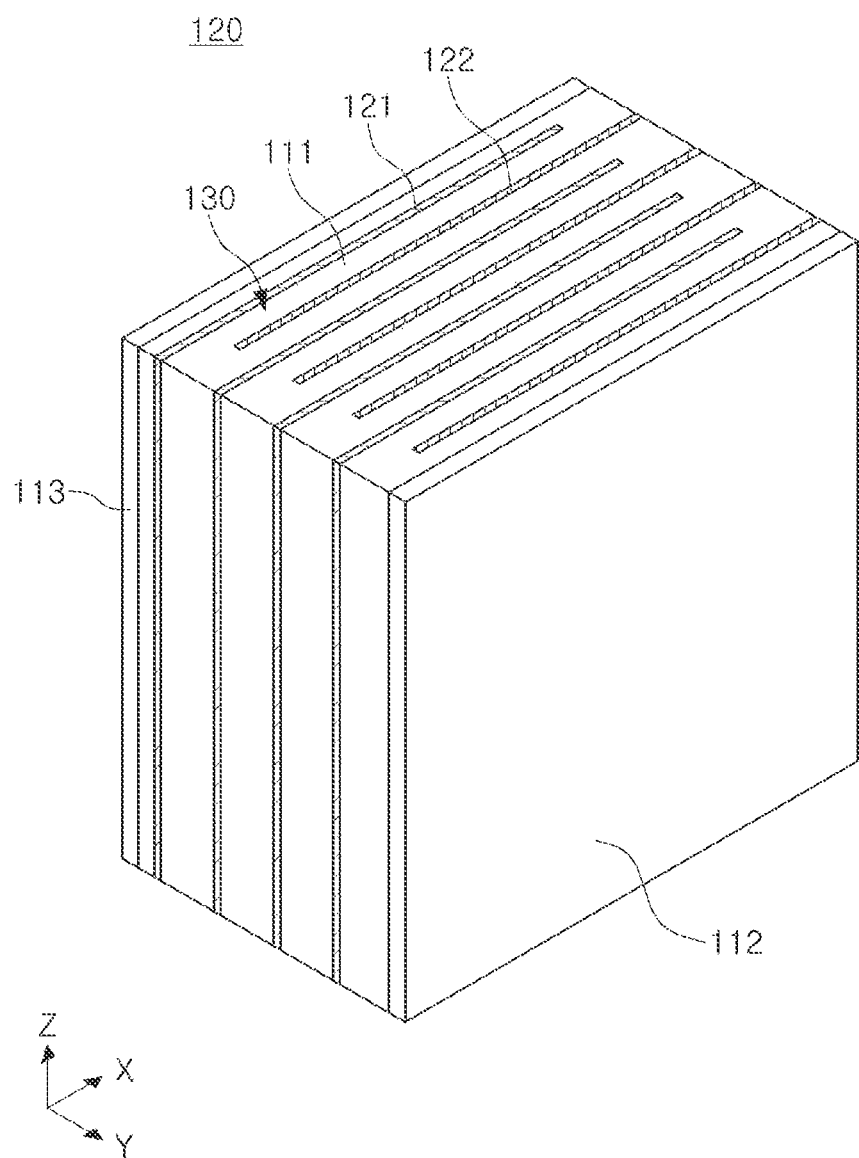
FIG. 3 is a perspective view illustrating a structure in which a first cover portion and a second cover portion are removed from the ceramic body of FIG. 2.
Figure 4:
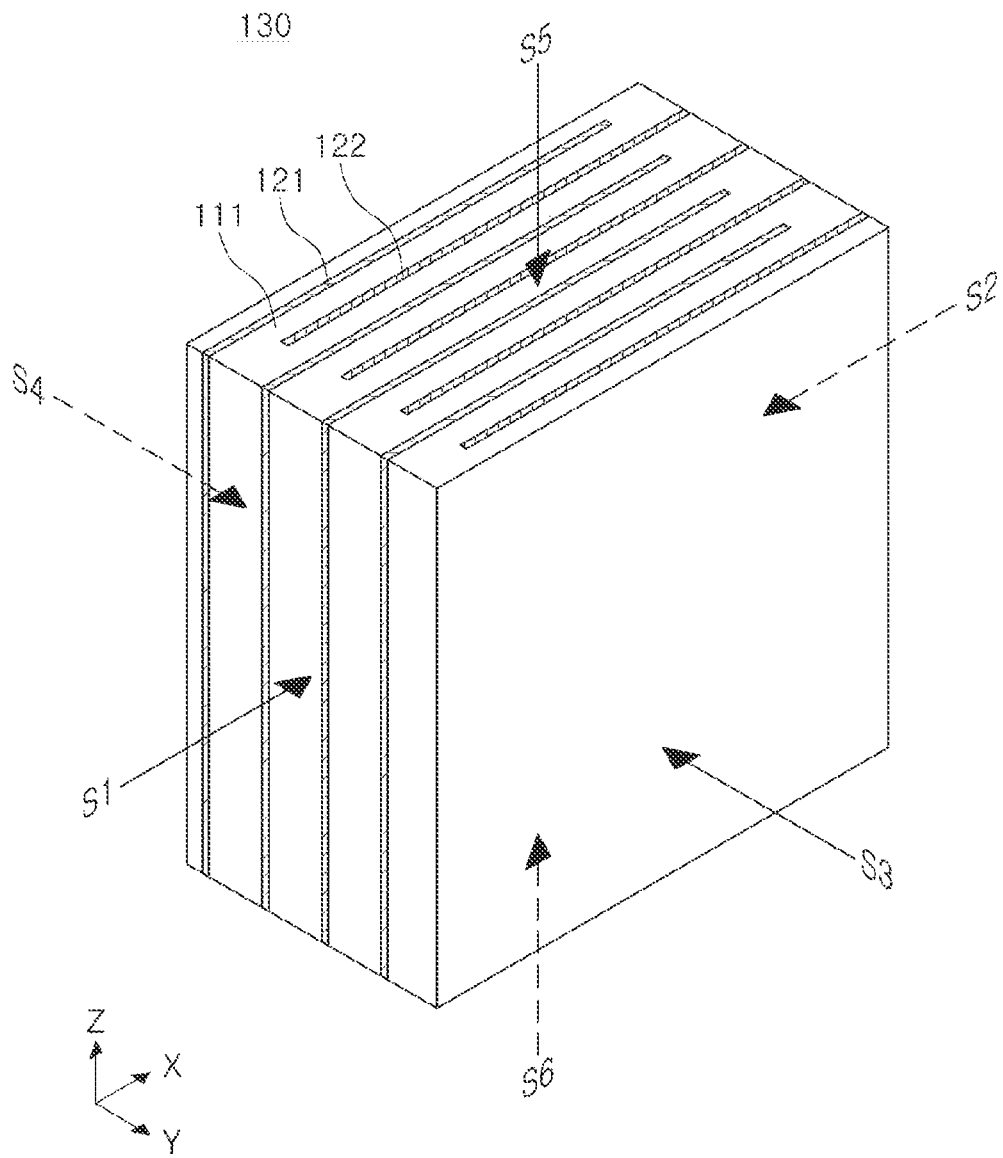
FIG. 4 is a perspective view schematically illustrating the capacitance formation portion of FIG. 2.
Figure 5:
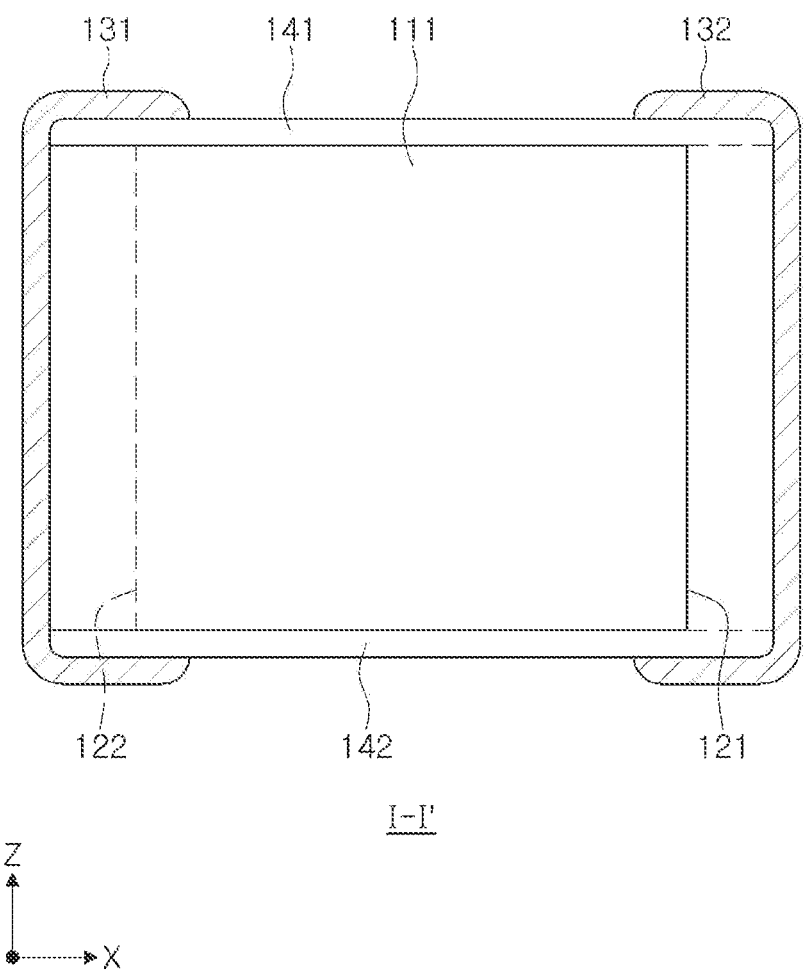
FIG. 5 is a cross-sectional view taken along line I-I' of FIG. 1.

In the above embodiment, the first cover portion 141 and the second cover portion 142 may be disposed to be in contact with the dielectric layer 111, the first internal electrode 121 and the second internal electrode 122, respectively. FIG. 2 is a diagram illustrating a ceramic body in which a capacitance formation portion, first and second margin portions, and first and second cover portions are disposed, and FIG. 3 is a diagram illustrating a structure in which a first margin portion and a second margin portion are disposed on both surfaces of the capacitance formation portion in a second direction (Y direction). Referring to FIGS. 2 and 3, the first internal electrode 121 of the multilayer ceramic electronic component 100 according to the present disclosure may be exposed to the first surface S1, the fifth surface S5, and the sixth surface S6 of the capacitance formation portion 130, and the second internal electrode 122 may be exposed to the second surface S2, the fifth surface S5, and the sixth surface S6 of the capacitance formation portion 130. The first cover portion 141 may be disposed to be in contact with the first internal electrode 121 and the second internal electrode 122 exposed to the fifth surface S5 of the capacitance formation portion 130, and the second cover portion 142 may be disposed to be in contact with the first internal electrode 121 and the second internal electrode 122 exposed to the sixth surface S6 of the capacitance formation portion 130.

In one example, a first margin portion 141 may be disposed on the third surface S3 of the capacitance formation portion 130 of the multilayer ceramic electronic component 100 of the present disclosure, and a second margin portion 142 may be disposed on the fourth surface S4. In addition, referring to FIG. 2, the first cover portion 141 of the ceramic body 110 of the multilayer ceramic electronic component 100 according to the present embodiment may be disposed to be in contact with one surface of the capacitance formation portion 130, the first margin portion 112, and the second margin portion 113 in a third direction (Z direction), and the second cover portion 142 may be disposed to be in contact with the other surface of the capacitance formation portion 130, the first margin portion 112, and the second margin portion 113 in a third direction (Z direction). That is, the ceramic body 110 of the above embodiment may have a structure in which the first cover portion 141 and the second cover portion 142 are respectively attached to both surfaces of the capacitance formation portion 130, and the first margin portion 112 and the second margin portion 113 in a third direction (Z direction), after the first margin portion 112 and the second margin portion 113 are attached to both surfaces of the capacitance formation portion 130 in a second direction (Y direction) first.

Figure 8:
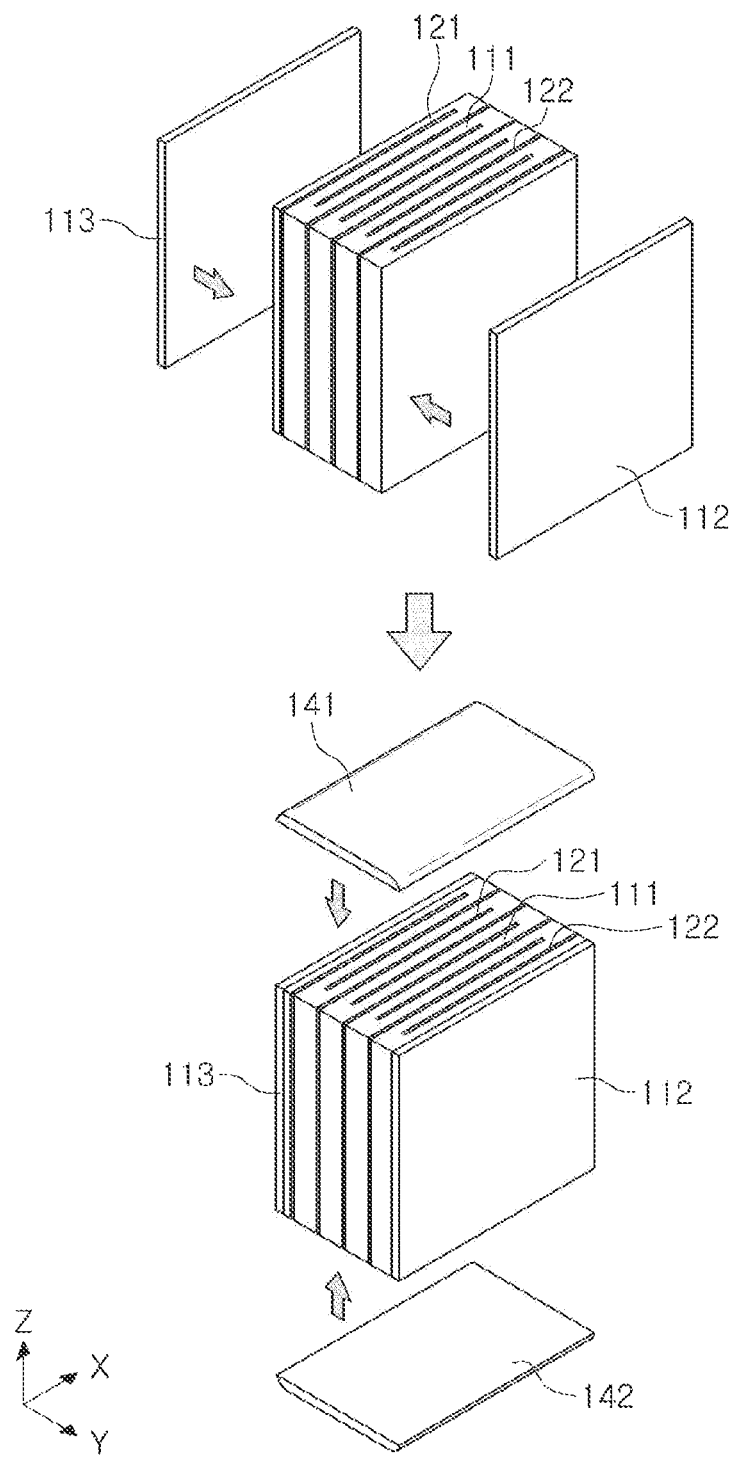
FIG. 8 is a perspective view schematically illustrating a part of a manufacturing process of a multilayer ceramic electronic component according to an embodiment of the present disclosure.

FIG. 8 is a schematic diagram schematically illustrating a process of manufacturing the structure. Referring to FIG. 8, in the multilayer ceramic electronic component 100 of the present embodiment, a first margin portion 112 and a second margin portion 113 may first be attached to the capacitance formation portion 130, and a first cover portion 141 and the second cover portion 142 may be attached. Therefore, the first cover portion 141 may be disposed to be in contact with a first internal electrode 121 and a second internal electrode 122 exposed to the fifth surface S5, and simultaneously, may be disposed to be in contact with a first margin portion 112 and a second margin portion 113 respective disposed on the third surface S3 and the fourth surface S4 of the capacitance formation portion 130. In addition, the second cover portion 142 may be disposed to be in contact with the first internal electrode 121 and the second internal electrode 122 exposed to the sixth surface S6 of the capacitance formation portion 130, and simultaneously, may be disposed to be in contact with the first margin portion 112 and the second margin portion 113 respectively disposed on the third surface S3 and the fourth surface S4 of the capacitance formation portion 130.

In one example, the ceramic body 110 may include an interface at which the first cover portion 141 and the first and second margin portions 112 and 113 are in contact, and an interface at which the second cover portion 142 and the first and second margin portions 112 and 113 are in contact, respectively. In the present specification, the term "interface" may mean a surface at which two layers in contact with each other are distinguishable from each other. The distinguishable state may mean that the two layers are distinguished due to a physical difference, a chemical difference, and/or a simple optical difference. The interface may be visually confirmed through a scanning electron microscope (SEM), but is not limited thereto. When it is difficult to be visually confirmed, the interface may be confirmed through a physical property analysis of the first and second cover portions 141 and 142 and the first and second margin portions 112 and 113.

Figure 6:
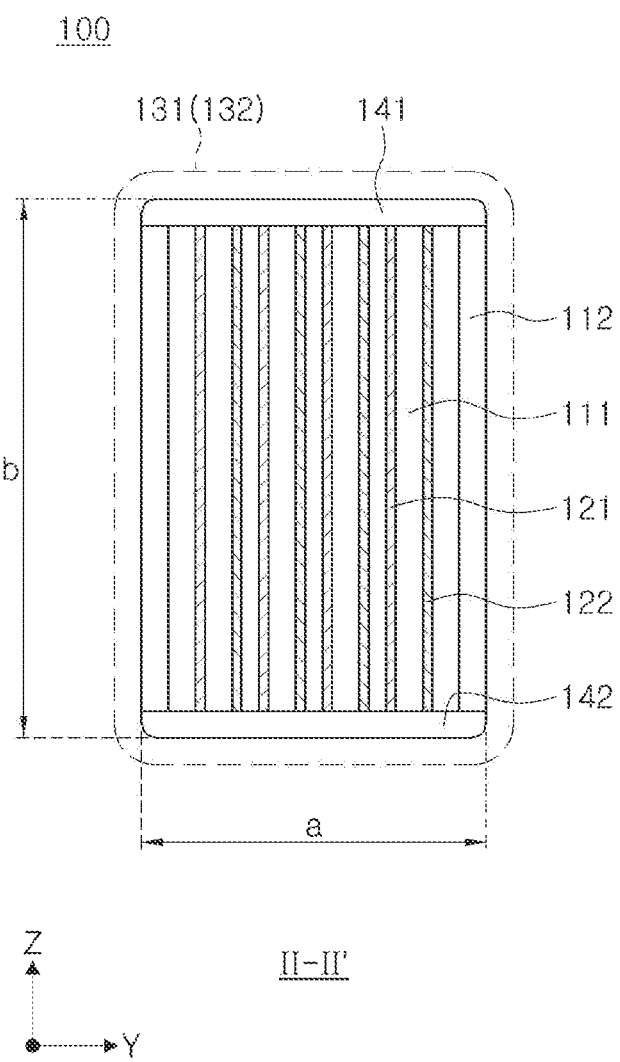
FIG. 6 is a cross-sectional view taken along line II-II' of FIG. 1.
Figure 7:
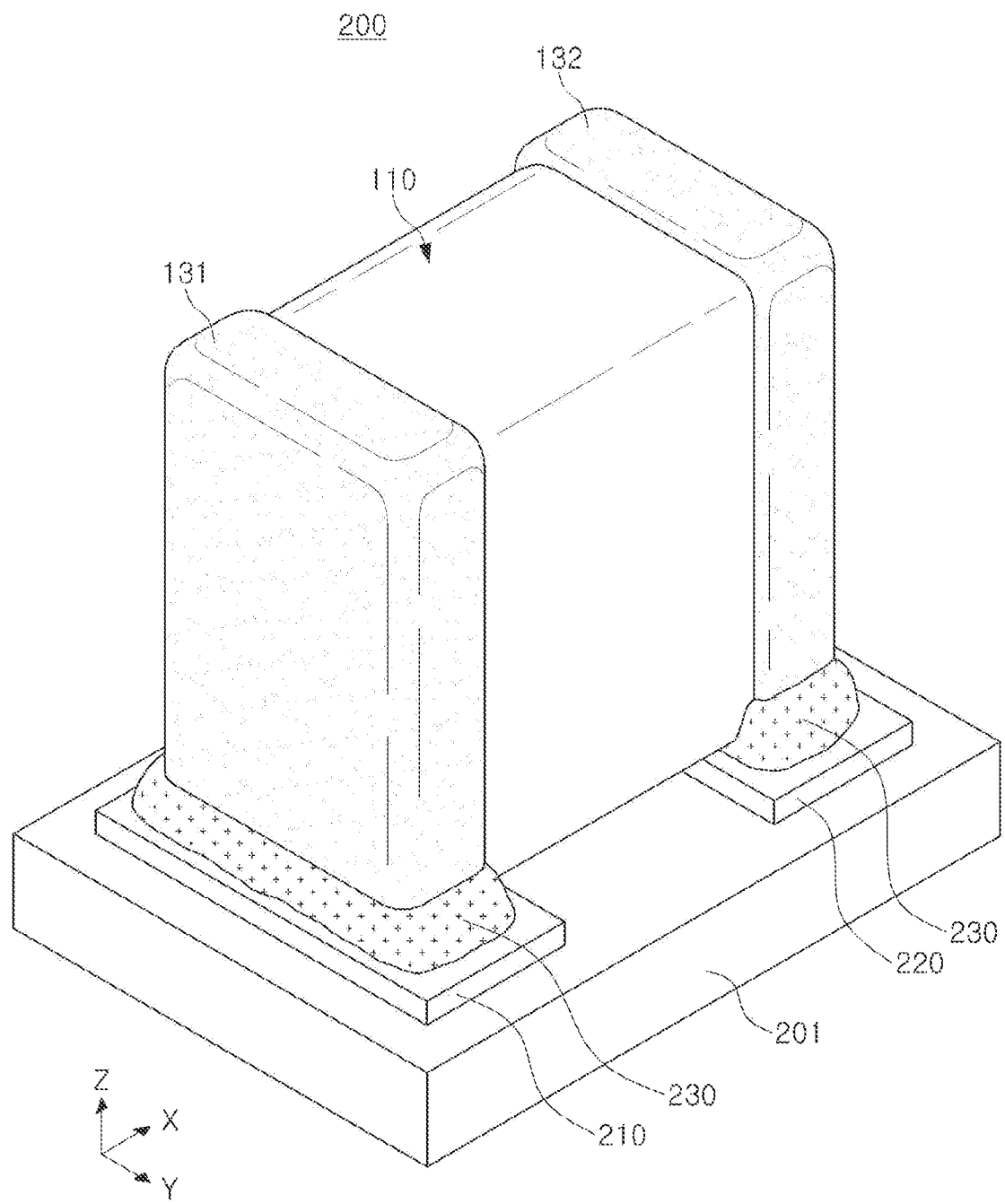
FIG. 7 is a perspective view schematically illustrating a board for mounting a multilayer ceramic electronic component according to an embodiment of the present disclosure.

In the above example, the interface at which the first cover portion 141 and the first and second margin portions 112 and 113 are in contact may be disposed on the same plane as the fifth surface S5 of the capacitance formation portion 130, and the interface at which the second cover portion 142 and the first and second margin portions 112 and 113 are in contact may be disposed on the same plane as the sixth surface S6 of the capacitance formation portion 130. Referring to FIGS. 2 and 6, the interface at which the first cover portion 141 and the first and second margin portions 112 and 113 of the multilayer ceramic electronic component 100 according to the present example are in contact may be disposed on the same plane as the fifth surface S5 of the capacitance formation portion 130, and the interface at which the second cover portion 142 and the first and second margin portions 141 and 142 are in contact may be disposed on the same plane as the sixth surface S6 of the capacitance formation portion 130. The interface is disposed on the same plane as any one surface of the capacitance formation portion 130, which may not mean only the same plane in a strict sense, but may include a case in which an angle between the interface and any one surface of the capacitance formation portion 130 is within a certain range. The range of the angle may mean an angle of 10° or less, for example, and a lower limit thereof is not particularly limited, but may be, for example, 0° or more. The angle of any one surface of the interface and the capacitance formation portion 130 may mean an average of angles of the surfaces of the interface and the capacitance formation portion, in contact with any five locations on the one surface.

The first margin portion 112, the second margin portion 113, the first cover portion 141, and the second cover portion 142 may include a ceramic material, for example, barium titanate ($BaTiO_3$)-based ceramic material.

The first margin portion 112, the second margin portion 113, the first cover portion 141, and the second cover portion 142 may be formed by stacking a single dielectric layer or two or more dielectric layers, respectively, and may basically serve to prevent damages to internal electrodes due to physical or chemical stresses.

In an embodiment of the present disclosure, the first margin portion 112, the second margin portion 113, the first cover portion 141, and the second cover portion 142 of the multilayer ceramic electronic component 100 according to the present disclosure may include a ceramic component having a composition, similar to that of the dielectric layer 111 of the capacitance formation portion 130 as a main component. In the present specification, a term "main component" may mean a component occupying a relatively large weight ratio compared to other components, and may mean a component that is 50% by weight or more based on the weight of the entire composition or the entire dielectric layer. In addition, a term "subcomponent" may mean a component occupying a relatively small weight ratio compared to other components, and may mean a component that is less than 50% by weight based on the weight of the entire composition or the entire dielectric layer.

The main component may be a component represented by $(Ba_{1-x}Ca_x)(Ti_{1-y}(Zr, Sn, Hf)_y)O_3$ (where, $0 \leq x \leq 1$, $0 \leq y \leq 0.5$). The main component may be, for example, a chemical in which Ca, Zr, Sn and/or Hf are partially dissolved in $BaTiO_3$. In the above compositional formula, x may be in a range of 0 or more and 1 or less, and y may be in a range of 0 or more and 0.5 or less, but is not limited thereto. For example, when x is 0, y is 0, and z is 0 in the above compositional formula, the main component may be $BaTiO_3$.

In one example, the first margin portion 112, the second margin portion 113, the first cover portion 141, and the second cover portion 142 of the multilayer ceramic electronic component 100 according to the present disclosure may include one or more selected from a group consisting of sodium (Na), lithium (Li), and boron (B) as a subcomponent. In another example of the present disclosure, the first margin portion 112, the second margin portion 113, the first cover portion 141, and the second cover portion 142 of the multilayer ceramic electronic component 100 according to the present disclosure may include magnesium (Mg) as a subcomponent. As described above, by adjusting contents, the subcomponents of the first margin portion 112, the second margin portion 113, and the first cover portion 141 and the second cover portion 142, density of the first margin portion 112, the second margin portion 113, and the first cover portion 141 and the second cover portion 142 may be adjusted, thereby moisture resistance may be improved.

The first margin portion 112, the second margin portion 113, the first cover portion 141, and the second cover portion 142 may be formed to have the same composition, respectively, but it may be modified as necessary. For example, the first margin portion 112 and the second margin portion 113 may be formed to have the same composition, and the first cover portion 141 and the second cover portion 142 may be formed to have the same composition. The first and second margin portions 112 and 113 and the first and second cover portions 141 and 142 may be formed to have different compositions. In addition, the first margin portion 112, the second margin portion 113, the first cover portion 141, and the second cover portion 142 may be formed to have a composition, different from that of the dielectric layer of the capacitance formation portion, but is not limited thereto.

FIG. 8 is a schematic diagram schematically illustrating a method of manufacturing a multilayer ceramic electronic component 100 according to an embodiment of the present disclosure. Referring to FIG. 8, after a capacitance formation portion 130 is formed first, two ceramic sheets forming the first margin portion 112 and the second margin portion 113 are attached to the capacitance formation portion 130, and thereafter, a method of attaching two ceramic sheets forming the first cover portion 141 and the second cover portion 142 may be used, but is not limited thereto.

In the multilayer ceramic electronic component 100 according to an embodiment of the present disclosure, a first external electrode 131 and a second external electrode 132 may be disposed on an outer surface of the ceramic body 110. The first external electrode 131 may be connected to a first internal electrode 121, and the second external electrode 132 may be connected to a second internal electrode 122. In this case, the first external electrode 131 may be disposed on a first surface S1 of a capacitance formation portion 130 of the multilayer ceramic electronic component 100, and the second external electrode 132 may be disposed on a second surface S2 of the capacitance formation portion 130.

In one example, at least a portion of the first external electrode 131 of the multilayer ceramic electronic component 100 according to the present disclosure may be disposed to extend onto the third surface S3, the fourth surface S4, the fifth surface S5, and the sixth surface S6 of the capacitance formation portion 130. In addition, at least a portion of the second external electrode 132 may be disposed to extend onto the third surface S3, the fourth surface S4, the fifth surface S5, and the sixth surface S6 of the capacitance formation portion 130. In this case, the first external electrode 131 and the second external electrode 132 may be disposed to be spaced apart from each other. At least a portion of the first external electrode 131 and/or the second external electrode 132 are disposed to extend onto the third surface S3, the fourth surface S4, the fifth surface S5, and the sixth surface S6 of the capacitance formation portion 130, the extended portion may function as a so-called band portion, and may function to improve mounting strength and prevent moisture penetration of the multilayer ceramic electronic component 100 according to the present disclosure.

The first and second external electrodes 131 and 132 may be sintered electrodes including conductive metal and glass. The conductive metal may include, for example, one or more of nickel (Ni), copper (Cu), tin (Sn), palladium (Pd), platinum (Pt), iron (Fe), gold (Au), silver (Ag), tungsten (W), titanium (Ti), lead (Pb), and alloys thereof. The glass may be one or more selected from a group consisting of silicon oxide, boron oxide, aluminum oxide, transition metal oxide, alkali metal oxide, and alkaline earth metal oxide. The transition metal may be selected from a group consisting of zinc (Zn), titanium (Ti), copper (Cu), vanadium (V), manganese (Mn), iron (Fe), and nickel (Ni), the alkali metal may be selected from a group consisting of lithium (Li), sodium (Na) and potassium (K), and the alkaline earth metal may be one or more selected from a group consisting of magnesium (Mg), calcium (Ca), strontium (Sr), and barium (Ba).

As an example, the first and second external electrodes 131 and 132 may be formed by dipping a ceramic body including conductive metal then sintering the same, or by printing the conductive paste on a surface of the ceramic body by a screen-printing method, a gravure printing method, or the like, and sintering the same. In addition, a method in which the conductive paste is applied to the surface of the ceramic body or a dried film obtained by drying the conductive paste is transferred to the ceramic body and then sintering the same, may be used, but is not limited thereto. For example, it may be formed by forming the conductive paste on the ceramic body by various methods other than the above-described methods, and then sintering the same.

In one example, the multilayer ceramic electronic component 100 according to the present disclosure may further include plating layers respectively disposed on the first external electrode 131 and the second external electrode 132. The plating layer may include one or more selected from a group consisting of copper (Cu), nickel (Ni), tin (Sn), palladium (Pd), platinum (Pt), gold (Au), silver (Ag), tungsten (W), titanium (Ti), lead (Pb), and alloys thereof, but are not limited thereto. The plating layer may be formed of a single layer or a plurality of layers, and may be formed by sputtering or electroplating, but is not limited thereto.

The present disclosure also relates to a mounting board 200 of the multilayer ceramic electronic component.

A mounting board 200 of a multilayer ceramic electronic component according to the present disclosure includes: a multilayer ceramic electronic component 100 including a ceramic body 110 including a dielectric layer 111 and a first internal electrode 121 and a second internal electrode 122 disposed to oppose each other with the dielectric layer 111 interposed therebetween; a first margin portion 112 disposed on the third surface S3 of the capacitance formation portion 130; a second margin portion 113 disposed on the fourth surface S4 of the capacitance formation portion 130, a first cover portion 141 respectively disposed on both surfaces of the capacitance formation portion 130, the first margin portion 112, and the second margin portion 113 in the third direction (Z direction); and a second cover portion 142, a board 201 on which a first electrode pad 210, and a second electrode pad 220 are disposed on one surface in the third direction (Z direction), and a solder 230, wherein an average length of the ceramic body in the first direction satisfies a range of exceeding 1 time and/or less than 3 times the average width (a) of the ceramic body in the second direction, and an average width (a) of the ceramic body 110 in the second direction (Y direction) and an average height (b) of the ceramic body 110 in the third direction (Z direction) may satisfy b>a.

In one example, the first internal electrode 121 and the second internal electrode 122 of the mounting board 200 of the multilayer ceramic electronic component according to the present disclosure may be vertically disposed on the substrate 201.

In the mounting board 200 of the multilayer ceramic electronic component according to the present disclosure, a width (a) of a ceramic body 110 in the second direction (Y direction) and a height (b) of the ceramic body in the third direction (Z direction) may satisfy b≥1.2×a.

Since the multilayer ceramic electronic component 100 disposed on the mounting board 200 of the multilayer ceramic electronic component is the same as described above, which will be omitted.

Experimental Examples

In order to test reliability and a defect rate of the multilayer ceramic electronic component according to the present disclosure, 200 prototype chips each having a ceramic body having a size as shown in Table 1 below were manufactured.

A structure in which internal electrodes are disposed vertically with respect to a mounting surface, and first and second margin portions are formed, and then first and second cover portions are formed, was applied to the prototype chip. As Comparative example, an existing product, having a ceramic body having the same size as in Table 1 below, but having internal electrodes, horizontal with respect to the mounting surface, and first and second cover portions are formed first, and then first and second margin portions are formed, was used.

TABLE 1

| Sample | L | W | T |
|---|---|---|---|
| Lot 1 | 0.4 ± 0.1 | 0.2 ± 0.1 | 0.3 ± 0.15 |
| Lot 2 | 0.6 ± 0.1 | 0.3 ± 0.1 | 0.5 ± 0.15 |
| Lot 3 | 1.0 ± 0.3 | 0.5 ± 0.2 | 0.8 ± 0.3 |
| Lot 4 | 1.6 ± 0.3 | 0.8 ± 0.2 | 1.0 ± 0.3 |

(unit: mm)

TABLE 2

| Division | Amount of test chips | Defect rate of margin portion(ppm) |
|---|---|---|
| Comparative example | 34500 | 3768 |
| Example | 800 | 0 |

Table 2 is a result of checking whether or not lifting or flaring occurs in the margin portion of the manufactured chip. In the Example, 200 samples of each of 4 types were tested. In the case of Comparative example, which is a conventional product, a product in which lifting or flaring occurred in the margin portion was found, but in the Example, it could be confirmed that the result in which lifting or flaring in the margin portion does not occur.

TABLE 3

| Division | Amount of test chips | Defect rate of reliability(ppm) |
|---|---|---|
| Comparative example | 800 | 3750 |
| Example | 800 | 2500 |

Table 3 shows a frequency of defect, that after 2.8 voltage is applied under 85° C. and 60% relative humidity for 6 hours, and then the 2.8 V voltage is applied under 85° C. and 85% relative humidity for 12 hours, and then leaving it for 12 hours, was tested. In the Example, 200 samples of each of 4 types were tested.

Referring to Table 3, it can be seen that the frequency of occurrence of defects in the Example was reduced by 33.3% compared to the Comparative Example. Thereby, it can be seen that the moisture resistance reliability of the multilayer ceramic electronic component according to the present disclosure is greatly improved.

TABLE 4

| Division | Amount of test chips | Short defect rate (ppm) |
|---|---|---|
| Comparative example | 11490 | 88686 |
| Example | 400 | 60000 |

Table 4 is a result of checking the frequency of short-circuit defects occurring during a cutting process of ceramic chips. When cutting a ceramic chip, a defect in which a short circuit occurs may occur at an end of the internal electrode due to a pressing phenomenon on the cutting surface. Referring to Table 4, it can be seen that the short defect rate was reduced by 32.35% in the case of the Example compared to the Comparative example. Accordingly, it can be seen that the multilayer ceramic electronic component according to the present disclosure has a significantly improved short-circuit defect rate compared to conventional products.

As set forth above, according to one of the various effects of the present disclosure, it is possible to reduce an amount of short circuits in the multilayer ceramic electronic component and a mounting board thereof.

According to one of the various effects of the present disclosure, it is possible to improve moisture resistance reliability of the multilayer ceramic electronic component and the mounting board thereof.

According to one of the various effects of the present disclosure, it is possible to increase mounting density of a board of the multilayer ceramic electronic component and the mounting board thereof.

According to one of the various effects of the present disclosure, it is possible to increase a degree of freedom in mounting of the multilayer ceramic electronic component and the mounting board thereof.

However, various and advantageous advantages and effects of the present disclosure are not limited to the above description, and will be more readily understood in the process of describing specific embodiments of the present disclosure.

While example embodiments have been shown and described above, it will be apparent to those skilled in the art that modifications and variations could be made without departing from the scope of the present disclosure as defined by the appended claims.

What is claimed is:

1. A multilayer ceramic electronic component, comprising:
    a ceramic body including a dielectric layer, and a first internal electrode and a second internal electrode disposed to oppose each other with the dielectric layer interposed between the first and second internal electrodes;
    a first external electrode connected to the first internal electrode; and
    a second external electrode connected to the second internal electrode,
    wherein the ceramic body comprises a capacitance formation portion including a first surface and a second surface opposing each other in a first direction, a third surface and a fourth surface opposing in a second direction, and a fifth surface and a sixth surface opposing in a third direction, and including:
    the first internal electrode and the second internal electrode stacked in the second direction to form capacitance,
    a first margin portion disposed on the third surface of the capacitance formation portion,
    a second margin portion disposed on the fourth surface of the capacitance formation portion, and
    a first cover portion and a second cover portion respectively disposed on, and defining an interface therebetween at which the first and second cover portions contact the first and second internal electrodes, both surfaces of the capacitance formation portion in the third direction, and the first and second margin portions in the third direction, wherein an average length of the ceramic body in the first direction is in a range from 1 to 3 times an average width (a) of the ceramic body in the second direction, wherein any one surface of both surfaces of the ceramic body in the third direction is a mounting surface for an external board, and wherein the average width (a) of the ceramic body in the second direction and an average height (b) of the ceramic body in the third direction satisfy b≥1.2×a.

2. The multilayer ceramic electronic component of claim 1, wherein a deviation (|x−y|/y) of an average height (x) of the first and second margin portions in the third direction and an average height (y) of the capacitance formation portion in the third direction is 5% or less.

3. The multilayer ceramic electronic component of claim 1, wherein the first cover portion and the second cover portion are disposed in contact with the dielectric layer, the first internal electrode, and the second internal electrode, respectively.

4. The multilayer ceramic electronic component of claim 3, wherein the first cover portion is disposed in contact with one surface of the capacitance formation portion, the first margin portion, and the second margin portion, in the third direction, wherein the second cover portion is disposed in contact with the other surface of the capacitance formation portion, the first margin portion, and the second margin portion, in the third direction.

5. The multilayer ceramic electronic component of claim 4, wherein an average thickness of the dielectric layer satisfies a range of 0.01 μm or more and/or 0.4 μm or less.

6. The multilayer ceramic electronic component of claim 1, wherein the first cover portion is disposed in contact with one surface of the capacitance formation portion, the first margin portion, and the second margin portion in the third direction, wherein the second cover portion is disposed in contact with the other surface of the capacitance formation portion, the first margin portion, and the second margin portion in the third direction.

7. The multilayer ceramic electronic component of claim 6, wherein an interface at which the first cover portion and the first and second margin portions are in contact is disposed on the same plane as the fifth surface of the capacitance formation portion, and an interface at which the second cover portion and the first and second margin portions are in contact is disposed on the same plane as the sixth surface of the capacitance formation portion.

8. The multilayer ceramic electronic component of claim 1, wherein an average thickness of the first internal electrode and the second internal electrode is 0.4 μm or less.

9. The multilayer ceramic electronic component of claim 1, wherein an average thickness of the dielectric layer is within a range of 0.01 μm or more and/or 0.4 μm or less.

10. The multilayer ceramic electronic component of claim 1, wherein the first external electrode is disposed on the first surface of the capacitance formation portion, and the second external electrode is disposed on the second surface of the capacitance formation portion.

11. The multilayer ceramic electronic component of claim 10, wherein at least a portion of the first external electrode is disposed to extend onto the third surface, the fourth surface, the fifth surface, and the sixth surface of the capacitance formation portion, and at least a portion of the second external electrode is disposed to extend onto the third surface, the fourth surface, the fifth surface, and the sixth surface of the capacitance formation portion.

12. The multilayer ceramic electronic component of claim 1, wherein the first internal electrode and/or the second internal electrode are exposed to the capacitance formation portion in the second direction, wherein the first margin portion and/or the second margin portion are disposed in contact with the first internal electrode and the second internal electrode, respectively.

13. A mounting board of a multilayer ceramic electronic component, comprising:

a ceramic body including a dielectric layer, and a first internal electrode and a second internal electrode disposed to oppose each other with the dielectric layer interposed between the first and second internal electrodes;

a first external electrode connected to the first internal electrode; and a second external electrode connected to the second internal electrode, wherein the ceramic body comprises a multilayer ceramic electronic component including, a capacitance formation portion including a first surface and a second surface opposing each other in a first direction, a third surface and a fourth surface opposing each other in a second direction, and a fifth surface and a sixth surface opposing each other in a third direction, and including:

the first internal electrode and the second internal electrode stacked in the second direction to form capacitance, a first margin portion disposed on the third surface of the capacitance formation portion, a second margin portion disposed on the fourth surface of the capacitance formation portion, and a first cover portion and a second cover portion respectively disposed on, and defining an interface therebetween at which the first and second cover portions contact the first and second internal electrodes, both surfaces of the capacitance formation portion in the third direction, and the first margin portion and the second margin portion in the third direction, a board on which a first electrode pad and a second electrode pad are disposed on one surface in the third direction, and a solder, wherein an average length of the ceramic body in the first direction is in a range from 1 to 3 times an average width (a) of the ceramic body in the second direction, wherein any one surface of both surfaces of the ceramic body in the third direction is a mounting surface for an external board, and wherein the average width (a) of the ceramic body in the second direction and an average height (b) of the ceramic body in the third direction satisfy b≥1.2×a.

14. The mounting board of a multilayer ceramic electronic component of claim 13, wherein the first internal electrode and the second internal electrode are vertically disposed on a substrate.

15. The mounting board of a multilayer ceramic electronic component of claim 13, wherein the first cover portion and the second cover portion are disposed in contact with the dielectric layer, the first internal electrode, and the second internal electrode, respectively.

16. The mounting board of a multilayer ceramic electronic component of claim 15, wherein the first cover portion is disposed in contact with one surface of the capacitance formation portion, the first margin portion, and the second margin portion, in the third direction,
wherein the second cover portion is disposed in contact with the other surface of the capacitance formation portion, the first margin portion, and the second margin portion, in the third direction.

17. The mounting board of a multilayer ceramic electronic component of claim 13, wherein one surface in which the first cover portion is in contact with the capacitance formation portion, the first margin portion and the second margin portion in the third direction, and another surface in which the second cover portion is in contact with the capacitance formation portion, the first margin portion and the second margin portion in the third direction are disposed to be parallel to a mounting surface of the board.

18. The mounting board of a multilayer ceramic electronic component of claim 13, wherein the first internal electrode and the second internal electrode have an average thickness of 0.4 μm or less.

19. The mounting board of a multilayer ceramic electronic component of claim 13, wherein the dielectric layer has an average thickness within a range of 0.01 μm or more and/or 0.4 μm or less.

20. The mounting board of the multilayer ceramic electronic component of claim 13, wherein the first external electrode is disposed on the first surface of the capacitance formation portion,
wherein the second external electrode is disposed on the second surface of the capacitance formation portion.

21. The mounting board of the multilayer ceramic electronic component of claim 20, wherein at least a portion of the first external electrode is disposed to extend onto the third surface, the fourth surface, the fifth surface, and the sixth surface of the capacitance formation portion, and
at least a portion of the second external electrode is disposed to extend onto the third, fourth, fifth and sixth surfaces of the capacitance formation portion.

22. The mounting board of a multilayer ceramic electronic component of claim 21, wherein an average thickness of the dielectric layer satisfies a range of 0.01 μm or more and/or 0.4 μm or less.

23. The mounting board of the multilayer ceramic electronic component of claim 13, wherein the first internal electrode and/or the second internal electrode is exposed to the capacitance formation portion in the second direction, and
the first margin portion and/or the second margin portion is disposed in contact with the first internal electrode or the second internal electrode, respectively.

24. A multilayer ceramic electronic component, comprising:
a ceramic body including a dielectric layer, and a first internal electrode and a second internal electrode disposed to oppose each other with the dielectric layer interposed between the first and second internal electrodes;
wherein the ceramic body comprises a capacitance formation portion including a first surface and a second surface opposing each other in a first direction, a third surface and a fourth surface opposing in a second direction, and a fifth surface and a sixth surface opposing in a third direction, a first margin portion disposed on the third surface, a second margin portion disposed on the fourth surface, a first cover portion and a second cover portion respectively disposed on, and defining an interface therebetween at which the first and second cover portions contact the first and second internal electrodes, both surfaces of the capacitance formation portion in the third direction, and including the first internal electrode and the second internal electrode stacked in the second direction to form capacitance,
wherein a length of the ceramic body in the first direction is in a range from 1 to 3 times a width of the ceramic body in the second direction,
wherein the fifth surface or the sixth surface is a mounting surface, and
wherein the height of the ceramic body in the third direction is at least equal to 1.2 times the width of the ceramic body in the second direction.

25. The multilayer ceramic electronic component of claim 24, wherein the first, second and third directions are perpendicular to each other.

26. The multilayer ceramic electronic component of claim 24, the capacitance formation portion further including a first cover portion and a second cover portion respectively disposed on surfaces of the capacitance formation portion in the third direction.

27. The multilayer ceramic electronic component of claim 26, wherein the first cover portion and the second cover portion are disposed in contact with the dielectric layer, the first internal electrode, and the second internal electrode, respectively.

28. The multilayer ceramic electronic component of claim 27, wherein the first cover portion is disposed in contact with the fifth surface of the capacitance formation portion, and a first margin portion of the capacitance formation portion and a second margin portion of the capacitance formation portion in the third direction, wherein the first margin portion is disposed on the third surface of the capacitance formation portion and the second margin portion is disposed on the fourth surface of the capacitance formation portion, and
wherein the second cover portion is disposed in contact with the sixth surface of the capacitance formation portion, and the first margin portion and the second margin portion in the third direction.

29. The multilayer ceramic electronic component of claim 24, wherein an average thickness of the first internal electrode and the second internal electrode is 0.4 μm or less.

30. The multilayer ceramic electronic component of claim 24, wherein an average thickness of the dielectric layer is within a range of 0.01 μm or more and/or 0.4 μm or less.

31. The multilayer ceramic electronic component of claim 24, further comprising:
a first external electrode connected to the first internal electrode; and
a second external electrode connected to the second internal electrode.

32. The multilayer ceramic electronic component of claim 31, wherein the first external electrode is disposed on the first surface of the capacitance formation portion, and
the second external electrode is disposed on the second surface of the capacitance formation portion.

33. The multilayer ceramic electronic component of claim 32, wherein at least a portion of the first external electrode is disposed to extend onto the third surface, the fourth surface, the fifth surface, and the sixth surface of the capacitance formation portion, and
at least a portion of the second external electrode is disposed to extend onto the third surface, the fourth surface, the fifth surface, and the sixth surface of the capacitance formation portion.

34. The multilayer ceramic electronic component of claim 24, wherein the first internal electrode and/or the second internal electrode are exposed to the capacitance formation portion in the second direction.

35. The multilayer ceramic electronic component of claim 24, wherein the length is an average length of the ceramic body in the first direction, the width is an average width of the ceramic body in the second direction, and the height is an average height of the ceramic body in the third direction.

* * * * *